(12) United States Patent
Soriaga et al.

(10) Patent No.: US 10,945,254 B2
(45) Date of Patent: Mar. 9, 2021

(54) PAGING DESIGN WITH SHORT MESSAGE INDICATOR

(71) Applicant: QUALCOMM Incorporated, San Diego, CA (US)

(72) Inventors: Joseph Binamira Soriaga, San Diego, CA (US); Muhammad Nazmul Islam, Littleton, MA (US); Ozcan Ozturk, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/407,672

(22) Filed: May 9, 2019

(65) Prior Publication Data

US 2019/0349902 A1 Nov. 14, 2019

Related U.S. Application Data

(60) Provisional application No. 62/674,402, filed on May 21, 2018, provisional application No. 62/670,549, filed on May 11, 2018.

(51) Int. Cl.
*H04W 72/04* (2009.01)
*H04W 72/12* (2009.01)
*H04W 68/00* (2009.01)

(52) U.S. Cl.
CPC ....... *H04W 72/042* (2013.01); *H04W 68/005* (2013.01); *H04W 72/1289* (2013.01)

(58) Field of Classification Search
None
See application file for complete search history.

(56) References Cited

U.S. PATENT DOCUMENTS

| 9,930,508 | B2 * | 3/2018 | Lee | H04W 4/06 |
| 2009/0239498 | A1 * | 9/2009 | Lee | H04W 4/90 |
| | | | | 455/404.1 |

(Continued)

FOREIGN PATENT DOCUMENTS

EP 3240347 A1 11/2017

OTHER PUBLICATIONS

Ericsson: "Simultaneous Paging and Notification of ETWS/CMAS/SI Update", 3GPP TSG RAN WG2 Meeting #102, 3GPP Draft; R2-1807209—Simultaneous Paging and Notification of ETWS-CMAS-SI Update, 3rd Generation Partnership Project (3GPP), Mobile Competence Centre, 650, Route Des Lucioles; F-06921 Sophia-Antipolis Cedex, France, vol. RAN WG2, No. Busan, Korea; May 21, 2018-May 25, 2018, May 20, 2018 (May 20, 2018), pp. 1-2, XP051443618, Retrieved from the Internet: URL: http://www.3gpp.org/ftp/Meetings_3GPP_SYNC/RAN2/Dosc/ ... retrieved on Apr. 15, 2018.

(Continued)

*Primary Examiner* — Otis L Thompson, Jr.
(74) *Attorney, Agent, or Firm* — QUALCOMM Incorporated

(57) ABSTRACT

Certain aspects of the present disclosure provide techniques communicating in a wireless network. In one embodiment, a method includes monitoring for a paging downlink control channel comprising downlink control information, wherein the downlink control information comprises a first short message; processing the first short message; determining if the control information further comprises scheduling information; processing the scheduling information if the downlink control information comprises scheduling information and the UE is not in a connected state; and ignoring the scheduling information if the downlink control information (Continued)

comprises scheduling information and the UE is in a connected state.

29 Claims, 10 Drawing Sheets

(56) References Cited

U.S. PATENT DOCUMENTS

| | | | | |
|---|---|---|---|---|
| 2015/0358827 | A1* | 12/2015 | Bendlin | H04W 16/14 |
| | | | | 455/454 |
| 2017/0280481 | A1* | 9/2017 | Stern-Berkowitz | ......................... |
| | | | | H04W 74/008 |
| 2018/0131482 | A1* | 5/2018 | Zhou | H04L 5/0012 |
| 2019/0239187 | A1* | 8/2019 | Islam | H04W 68/02 |
| 2019/0320455 | A1* | 10/2019 | Chen | H04L 5/001 |
| 2019/0349964 | A1* | 11/2019 | Liou | H04W 72/1284 |
| 2020/0137669 | A1* | 4/2020 | Lee | H04W 68/005 |
| 2020/0163048 | A1* | 5/2020 | Kim | H04W 68/005 |
| 2020/0163050 | A1* | 5/2020 | Lee | H04W 68/02 |

OTHER PUBLICATIONS

Huawei., et al., "DCI Contents and Formats for RMSI/OSI/Paging/RAR", 3GPP TSG RAN WG1 Meeting #92 bis, 3GPP Draft; R1-1804426, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 5 Pages, XP051426708, Retrieved from the Internet: URL: http://www.3gpp.org/ftp/Meetings_3GPP_SYNC/RAN1/Docs/ retrieved on Apr. 15, 2018.
International Search Report and Written Opinion—PCT/US2019/031741—ISA/EPO—dated Sep. 11, 2019.
LG Electronics: "Paging Design in NR", 3GPP TSG RAN WG1 Meeting #92bis, 3GPP Draft; R1-1804537 LG_PAGING_FINAL, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 5 Pages, XP051426806, Retrieved from the Internet URL: http://www.3gpp.org/ftp/Meetings_3GPP_SYNC/RAN1/Docs/ retrieved on Apr. 15, 2018.
Mediatek Inc: "Remaining Issues for Paging", 3GPP TSG RAN WG1 Meeting #92bis, 3GPP Draft; R1-1804054_Remaining Issues for Paging, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), pp. 1-2, XP051426343, Retrieved from the Internet: URL: http://www.3gpp.org/ftp/Meetings_3GPP_SYNC/RAN1/Docs/ [retrieved on Apr. 15, 2018].
Qualcomm Incorporated: "Paging Design Consideration", 3GPP TSG WG1 Meeting #92bis, 3GPP Draft; R1-1804777, 3rd Generation Partnership Project (3GPP), Mobile Competence Centre, 650, Route Des Lucioles; F-06921 Sophia-Antipolis Cedex, France, vol. RAN WG1, No. Sanya, China; Apr. 16, 2018-Apr. 20, 2018, Apr. 15, 2018 (Apr. 15, 2018), 5 Pages, XP051427044, Retrieved from the Internet: URL: http://www.3gpp.org/ftp/Meetings_3GPP_SYNC/RAN1/Docs/ [retrieved on Apr. 15, 2018].
Qualcomm Incorporated: "Paging Design Consideration", 3GPP TSG RAN WG1 Meeting #93, 3GPP Draft; R1-1807331, 3rd Generation Partnership Project (3GPP), Mobile Competence Centre, 650, Route Des Lucioles; F-06921 Sophia-Antipolis Cedex, France, vol. RAN WG1, No. Busan, Korea; May 21, 2018-May 25, 2018, May 20, 2018 (May 20, 2018), 4 Pages, XP051442523, Retrieved from the Internet: URL: http://www.3gpp.org/ftp/Meetings_3GPP_SYNC/RAN1/Docs/ [retrieved on May 20, 2018].

* cited by examiner

PAGING DESIGN WITH SHORT MESSAGE INDICATOR

CROSS-REFERENCE TO RELATED APPLICATIONS

This Application claims the benefit of U.S. Provisional Patent Application No. 62/674,402, filed May 21, 2018, and U.S. Provisional Patent Application No. 62/670,549, filed May 11, 2018, the contents of both of which are incorporated herein by reference in their entirety.

INTRODUCTION

Field of the Disclosure

Aspects of the present disclosure relate to wireless communications, and more particularly, to techniques for providing a paging design with a short message indicator.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE), including: monitoring for a paging downlink control channel comprising downlink control information, wherein the downlink control information comprises a first short message; processing the first short message; determining if the control information further comprises scheduling information; processing the scheduling information if the downlink control information comprises scheduling information and the UE is not in a connected state; and ignoring the scheduling information if the downlink control information comprises scheduling information and the UE is in a connected state.

Certain aspects provide a method for wireless communication by a network, including: transmitting a paging downlink control channel comprising downlink control information, wherein: the downlink control information comprises a first downlink control information message and a second downlink control information message, the first downlink control information message comprises a first short message, and the second downlink control information message comprises the scheduling information and a second short message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this dis

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
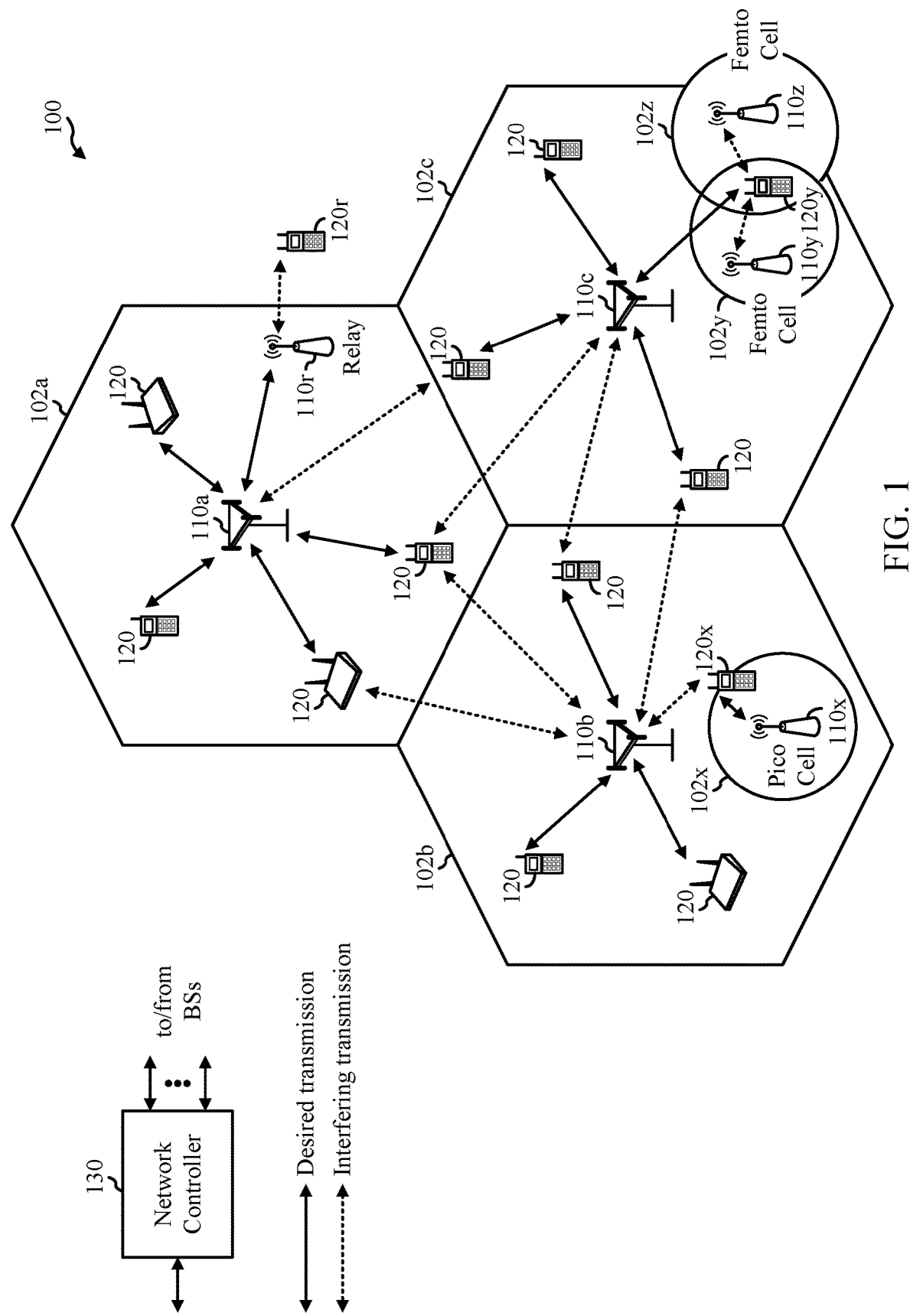
- FIG. 1 is a block diagram conceptually illustrating an example telecommunications system, in accordance with certain aspects of the present disclosure.

Aspects of the present disclosure provide apparatus, methods, processing systems, and computer readable mediums for providing a paging with a short message indicator.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize 01-DM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
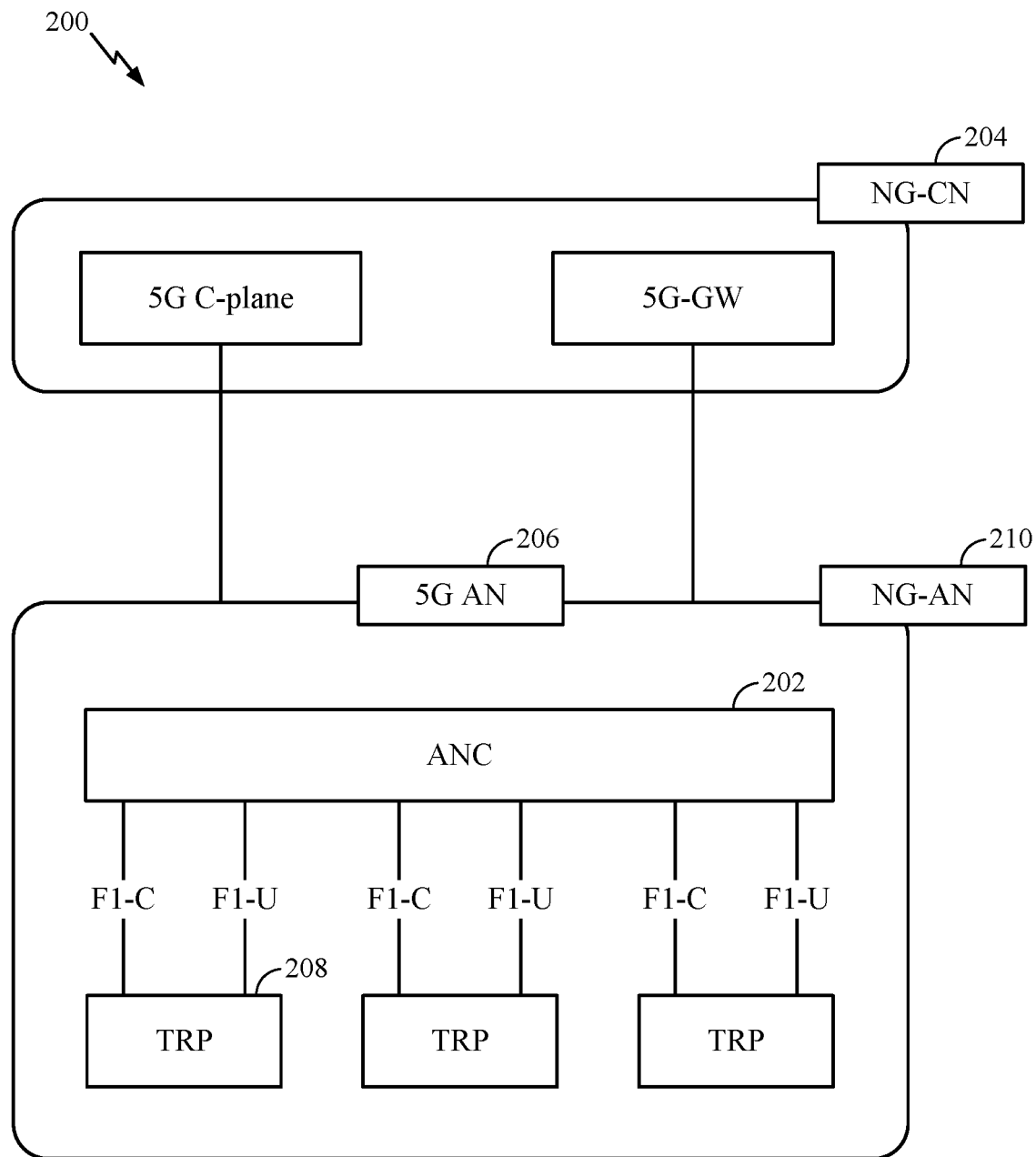
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
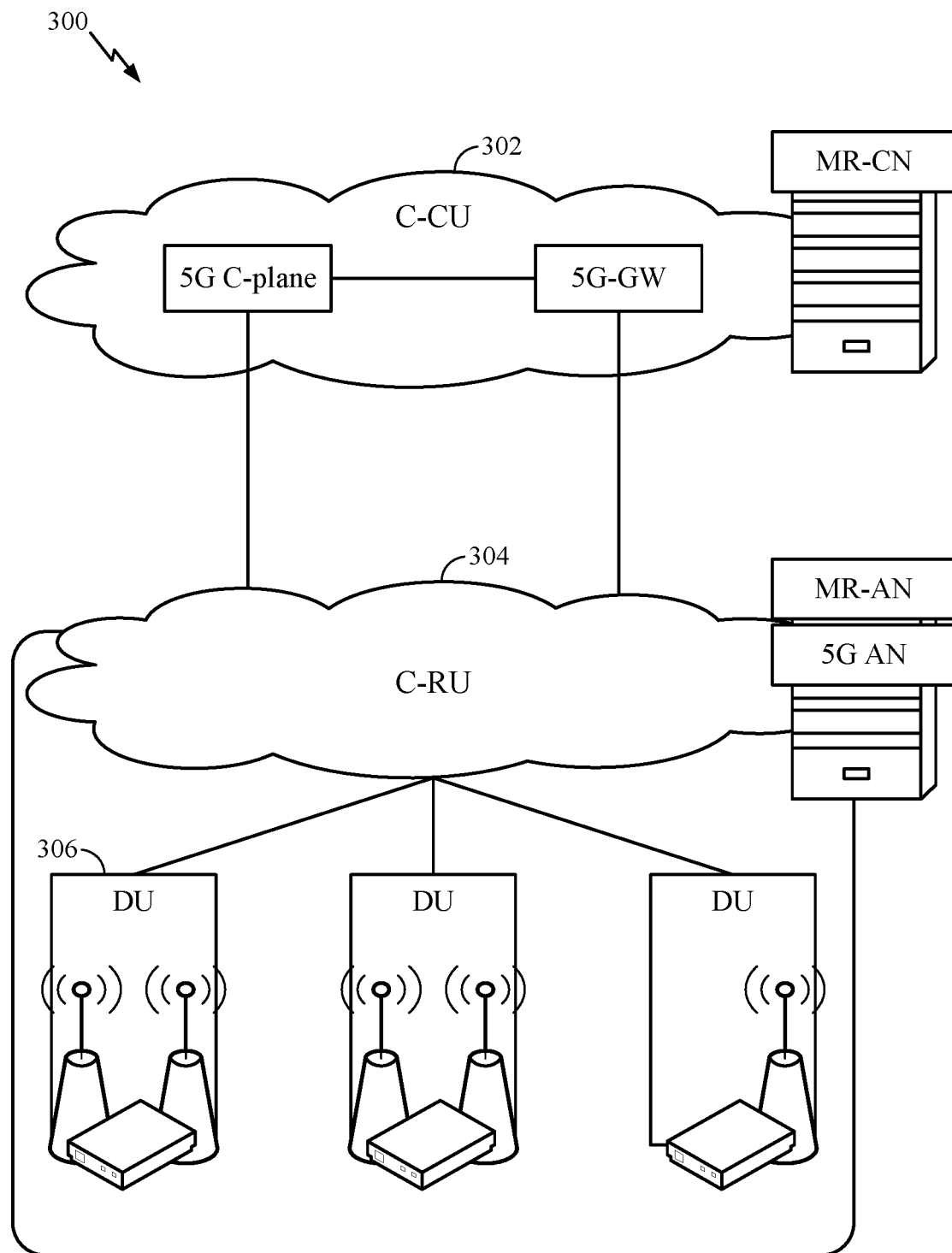
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
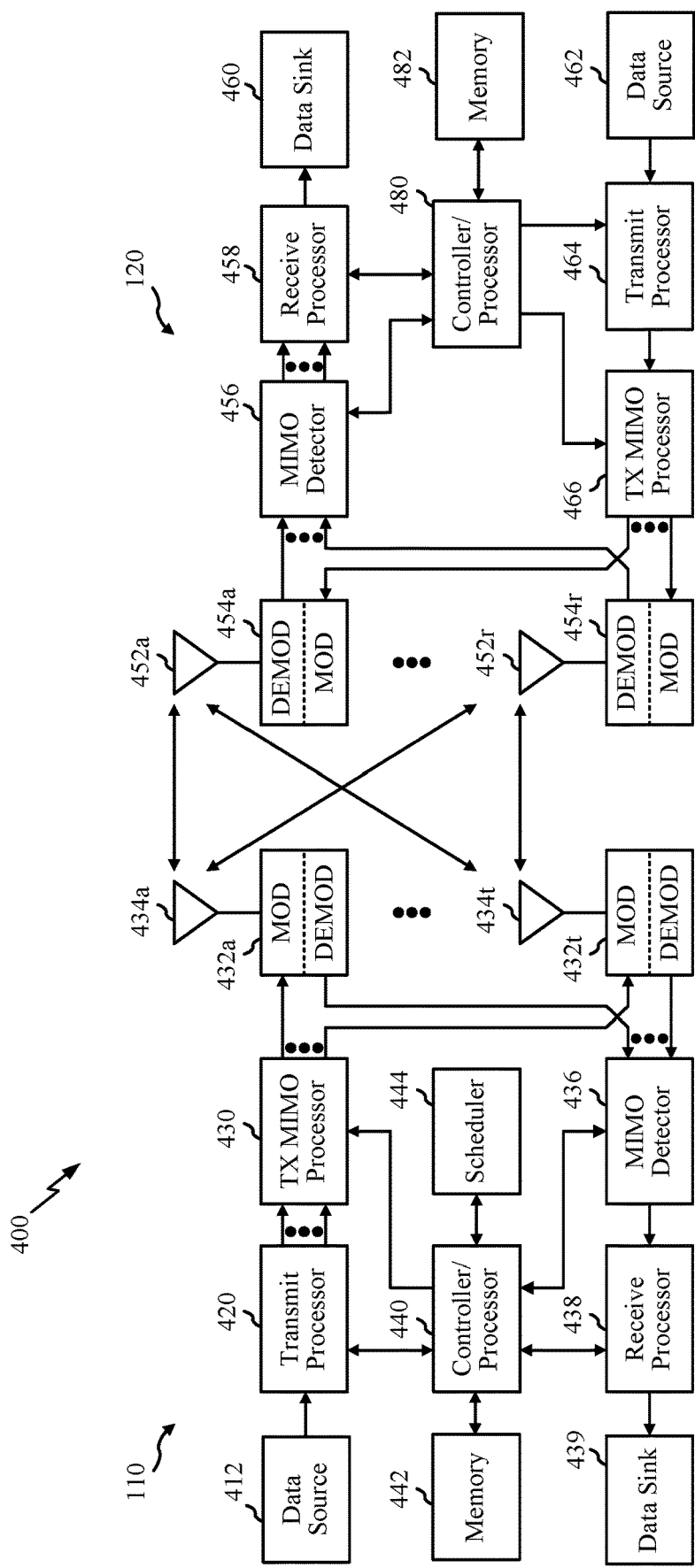
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein and illustrated in FIGS. 7 and 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for 01-DM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
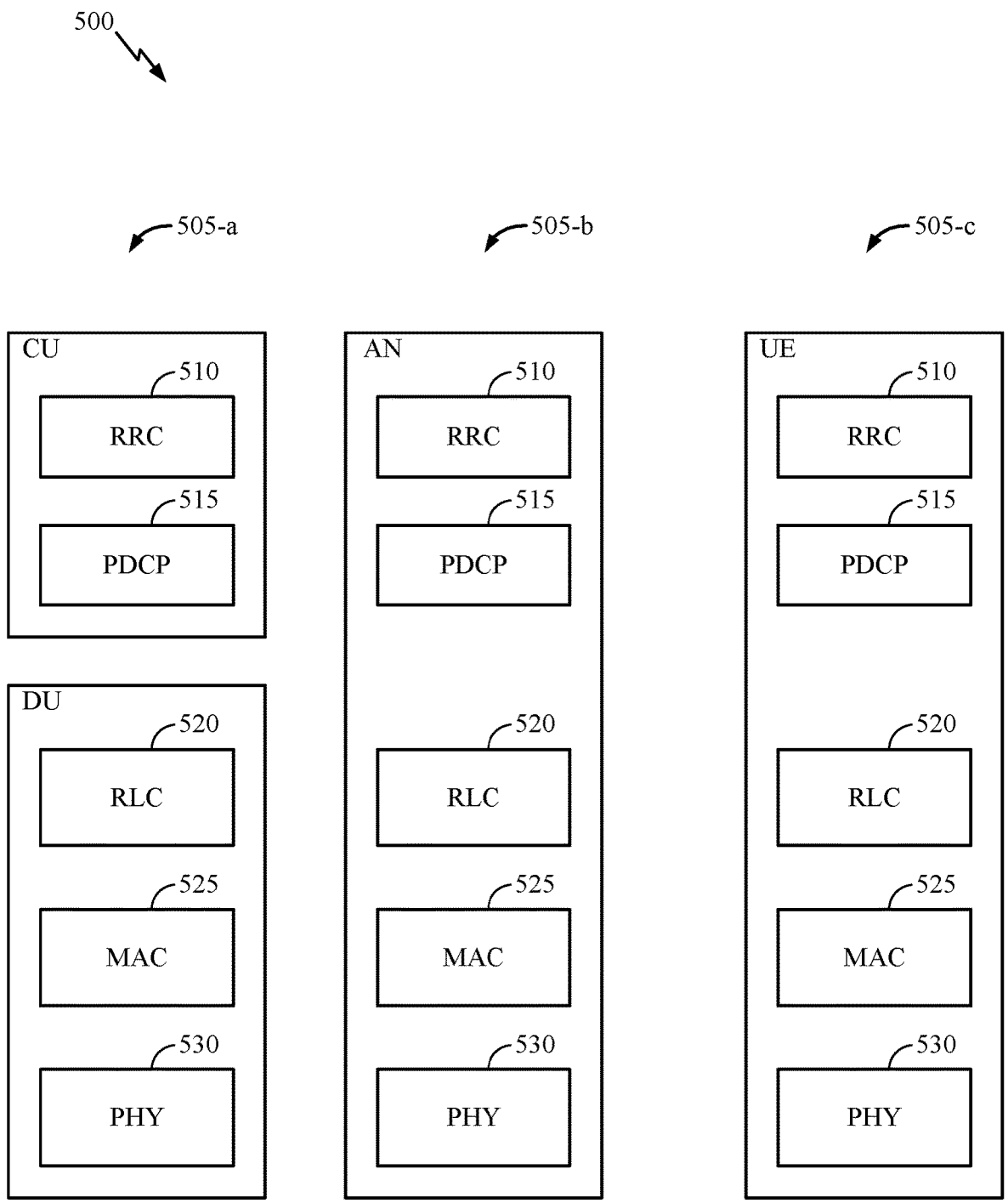
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
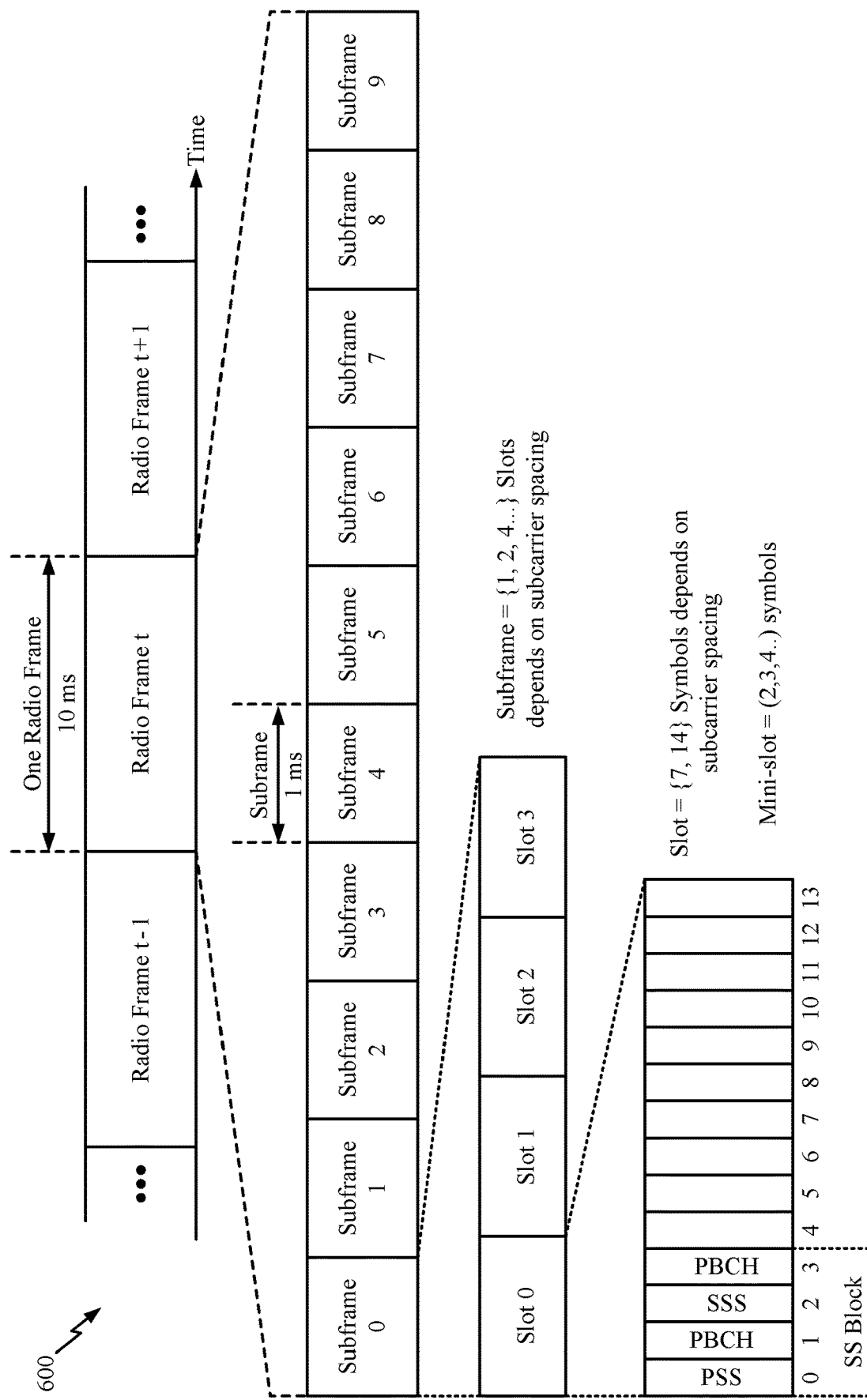
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIB s), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Paging Design with Short Message Indicator

NR paging downlink control information (DCI) may include various types of information, including short messages (e.g., 8 bit messages) and/or scheduling information. In some implementations, one or more bits within a DCI message may be used to indicate the presence of a short message and/or scheduling information within the DCI message. For example, the following is an example of how two short message indicator bits may be used in some implementations:

| Bit field | Short Message indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

When the short message indicator is not enabled, the DCI includes scheduling information for a PDSCH scrambled by the P-RNTI. Alternatively, when the short message indicator is enabled, this indicates that there is no scheduling information for the PDSCH scrambled by the P-RNTI. In such a case, the network may repurpose the portion of the DCI otherwise used for scheduling for a short paging message instead. The short paging message may include, for example, one or more of: a system information (SI) update, commercial mobile alert system (CMAS) update, or earth quake and tsunami warning system (ETWS) update, to name a few examples. Notably, an RRC_CONNECTED UE may monitor for an SI update notification during any paging occasion, and may not be required to decode P-RNTI PDSCH unless specifically requested or indicated. This sort of system configuration may enable more efficient operations. For example, UE power savings and better hardware implementation may be achieved because the UE may not have to over budget for rare and/or unnecessary events such as simultaneous P-RNTI scrambled PDSCH with cell— radio network temporary identifier (C-RNTI) scrambled PDSCH.

Handling paging messages in a P-RNTI-scrambled PDSCH with one or more short messages in DCI may include several consideration. For example, for an SI update, the network may not need to simultaneously send P-RNTI-scrambled PDSCH. Consequently, there may be no need to page UEs until they get an SI update to resolve the network configuration.

For commercial mobile alert system (CMAS) updates and earth quake and tsunami warning system (ETWS) updates, the network may delay and/or prioritize processing of various transmissions. For example, the network may send all short messages first, and then send any paging PDSCH messages to UEs thereafter. Alternatively, the network may delay ETWS updates or CMAS updates until all pages to UEs have been sent over the PDSCH.

Embodiments described herein present additional configurations for DCI messaging. For example, in a first implementation, a network may transmit two DCI messages scrambled by one P-RNTI and a blind decoding configuration for UEs. One of the two DCI messages may be a short message and the other may include scheduling information. A receiving IDLE UE may be configured to search for both DCIs, whereas an RRC_CONNECTED UE may be configured to search for the short message DCI, but may ignore the scheduling DCI message. In such a configuration, there is no additional complexity for the UE in searching for the DCI messages, but the network must be able to accommodate two paging DCIs.

In an alternative implementation, the network may transmit two DCI messages scrambled by two different P-RNTIs and a blind decoding configuration for UEs. As above, one of the two DCI messages may be a short message and the other may include scheduling information. And as above, a receiving IDLE UE may be configured to search for both DCIs, whereas an RRC_CONNECTED UE may be configured to search for the short message DCI, but may ignore the scheduling DCI message. In this alternative configuration, there is no additional complexity for the UE in searching for the DCI messages, but the UE may be able to prune based on the different P-RNTIs, and as above, the network must be able to accommodate two paging DCIs.

Embodiments described herein may implement alternative DCI format. For example, in a first implementation, a DCI may contain two types of short messages. In particular, the scheduling DCI reserved bits may be re-purposed as short message indicator bits, as described above, which indicate the presence of, for example, an SI-update, a CMAS update, or an ETWS update.

In such cases, the UE may be prompted to get the updates from the SI-RNTI once received in DCI. Further, in such cases, short message DCI may have more information in the DCI regarding the SI-update or CMAS or ETWS updates, which may be indicated through the same short message indicator, or a new null resource allocation. In such implementations, the network may send one DCI message and leverage a short message format depending on the network's preference. Further, an RRC_CONNECTED UE may still ignore scheduling information in scheduling DCI and read only the short format message.

Another alternative DCI format may contain two short message indicator bits that signal whether the UE is required to decode P-RNTI-scrambled PDSCH and drop C-RNTI-scrambled PDSCH. Thus, the network can send one DCI message and leverage a short message format depending on the network's preference. In this case, though, an RRC_CONNECTED UE may be configured to decode P-RNTI-scrambled PDSCH if indicated, and may ignore C-RNTI-scrambled PDSCH if it is overlapping. Thus, in some implementations, an RRC_CONNECTED UE may be configured to prioritize a P-RNTI-scrambled PDSCH whenever scheduling DCI is present, and drop any C-RNTI-scrambled PDSCH which is simultaneously overlapping in time.

Figure 7:
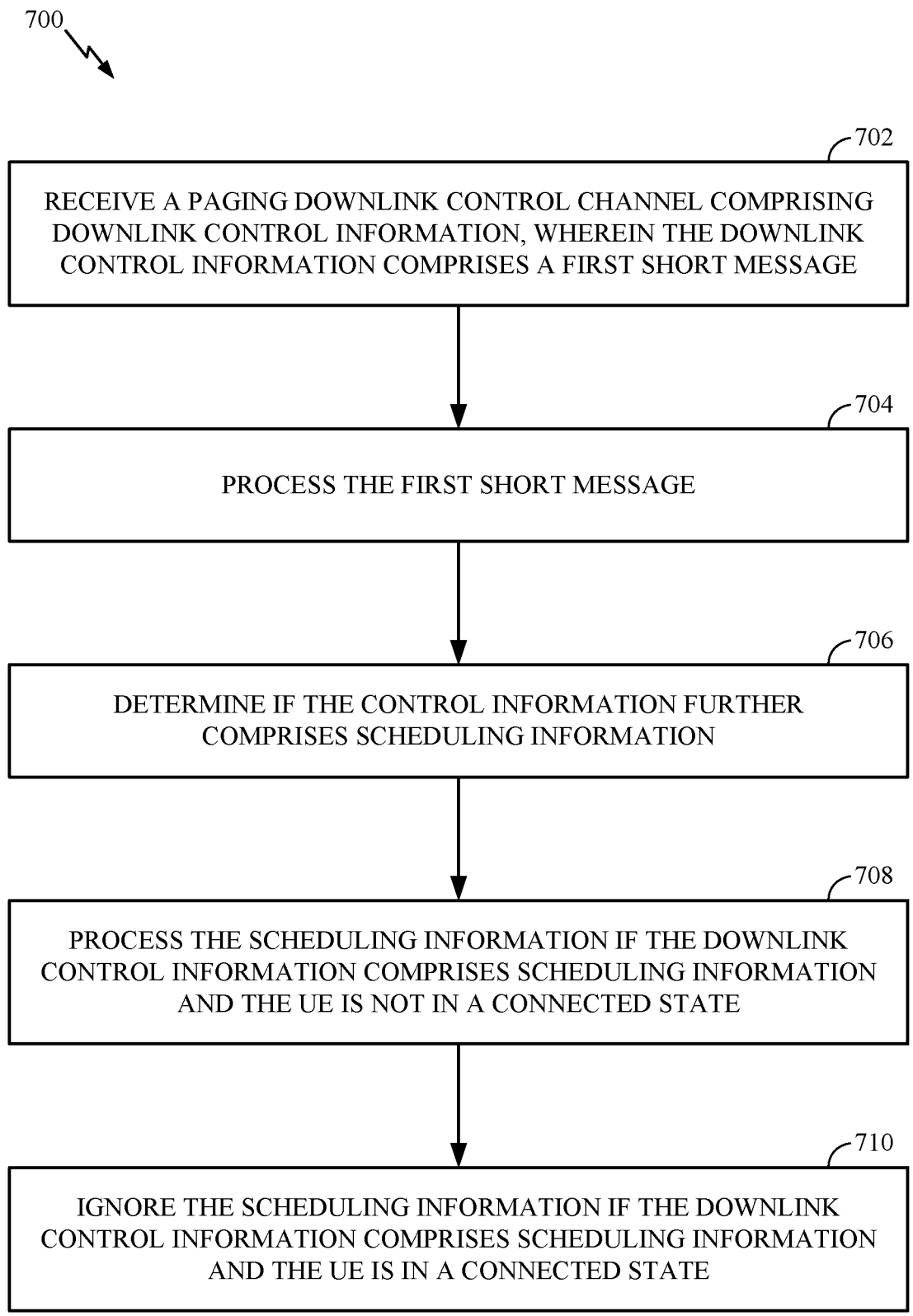
FIG. 7 illustrates example operations for wireless communications by a user equipment (UE), in accordance with aspects of the present disclosure.

FIG. 7 illustrates example operations for a method 700 for wireless communication by a user equipment (UE).

Method 700 begins at step 702 with receiving a paging downlink control channel comprising downlink control information, wherein the downlink control information comprises a first short message.

In some implementations, the downlink control information comprises a first downlink control information message and a second downlink control information message. In some implementations, the first downlink control information message comprises the first short message, and the second downlink control information message comprises the scheduling information and a second short message.

Method 700 then proceeds to step 704 with processing the first short message.

Method 700 then proceeds to step 706 with determining if the control information further comprises scheduling information.

Method 700 then proceeds to step 708 with processing the scheduling information if the downlink control information comprises scheduling information and the UE is not in a connected state.

Method 700 then proceeds to step 710 with ignoring the scheduling information if the downlink control information comprises scheduling information and the UE is in a connected state.

In some examples, the connected state of the UE is a radio resource control (RRC)-connected state.

In some implementations, the first downlink control information message and the second downlink control information message are scrambled by a same paging—radio network temporary identifier (P-RNTI).

In some implementations, the first downlink control information message and the second downlink control information message are scrambled by different paging—radio network temporary identifiers (P-RNTIs).

In some implementations, the second downlink control information message schedules a physical downlink shared channel (PDSCH) scrambled with a P-RNTI.

In some implementations, the first short message comprises a short paging message that comprises one or more of: a system information update, a commercial mobile alert system (CMAS) update, or an earth quake and tsunami warning system (ETWS) update.

In some implementations, the first downlink control information message comprises a first message format of a first bit length, and the second downlink control information message comprises a second format of a second bit length. In some implementations, the second bit length comprises a subset of bits that does not get used to schedule paging PDSCH in the second downlink control information message.

In some implementations, the first downlink control information message comprises more bits associated with at least one of an SI update, a CMAS update, or an ETWS update than the second downlink control information message.

In some implementations, the connected state of the UE is an idle state, and method 700 further includes processing a second short message.

In some implementations, at least one of the first downlink control information message or the second downlink control information message comprises a first indicator bit and a second indicator bit, and values of the first indicator bit and the second indicator bit are configured to signal the UE to decode a P-RNTI-scrambled PDSCH and to drop a cell—radio network temporary identifier (C-RNTI)-scrambled PDSCH.

Figure 8:
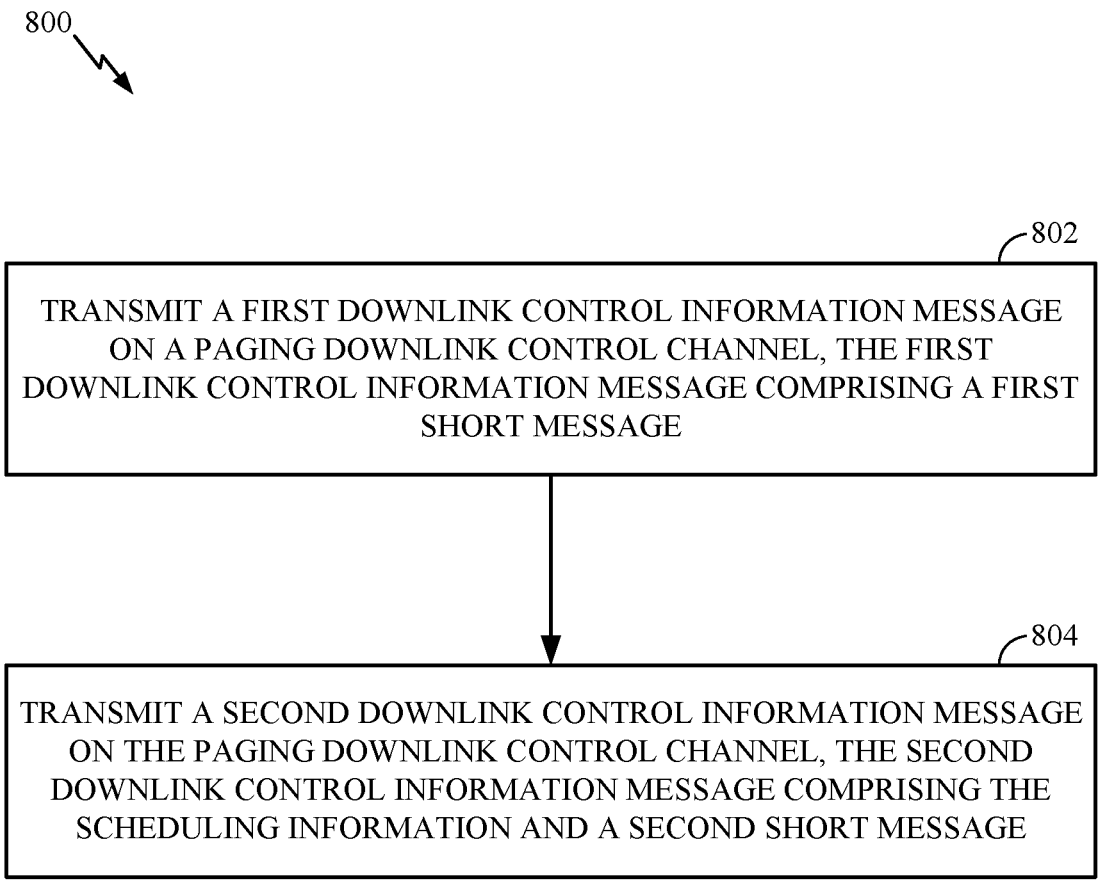
FIG. 8 illustrates example operations for wireless communications by a network entity, in accordance with aspects of the present disclosure.

FIG. 8 illustrates example operations for a method of wireless communications 800 that may be performed by a network entity, in accordance with aspects of the present disclosure.

Method 800 beings at step 802 with transmitting a first downlink control information message on a paging downlink control channel, the first downlink control information message comprising a first short message.

Method 800 then proceeds to step 804 with transmitting a second downlink control information message on the paging downlink control channel, the second downlink control information message comprising the scheduling information and a second short message.

In some implementations, the first short message comprises a short paging message that comprises one or more of: a system information update, a commercial mobile alert system (CMAS) update, or an earth quake and tsunami warning system (ETWS) update.

In some implementations, the second downlink control information message schedules a physical downlink shared channel (PDSCH) scrambled with a paging—radio network temporary identifier (P-RNTI).

In further embodiments of methods 700 and 800, described above, two DCI messages may be provided that are scrambled by a P-RNTI. A first DCI message may include one short message and the second DCI message may be a scheduling DCI message that includes scheduling information. In such a case, a network implementation may include having a network entity send the two DCI messages and the network entity may further send a blind decoding configuration for a UE.

A UE may be configured for a different behaviors depending on, for example, the state of the UE in addition during aspects of methods 700 and 800.

For example, an IDLE UE may be configured to search for both DCI messages. If the IDLE UE search detects both DCI messages, then the IDLE UE may be configured to process both messages. If, on the other hand, the UE is an RRC_CONNECTED state, the UE will only search for a short message within the DCI message. In such cases, if scheduling information is found in the DCI message, the RRC_CONNECTED UE may be configured to ignore the scheduling information.

In some examples of methods 700 and 800, different DCI messages may be scrambled with different P-RNTIs. The two DCI messages may include a first DCI message that includes one short message, and a second DCI message that includes scheduling information. In such cases, the network implementation may again include having a network entity send the two DCI messages as well as a blind decoding configuration for a UE.

In some examples of methods 700 and 800, a first DCI format may be used that that comprises a first short message of a first length. Further, a second format can used that comprises scheduling information and a second short message of a second length, wherein in this example the second length denotes the length of the second short message and not the length of the combined scheduling information and the second short message. Thus, DCI messages can contain two types of short messages.

In some implementations, bits reserved for scheduling in a DCI message may be re-purposed for short indications of, for example, an SI-update, a CMAS update, or an ETWS update. In some implementations, the UE can be prompted to get these from the system information radio network temporary identifier (SI-RNTI) once received in a DCI message.

In some cases, a short message within a DCI message of the first format may have more information regarding, for example, an SI-update, a CMAS update, or an ETWS update as compared to a DCI message in the second format.

In some implementations, an indication through the same short message indicator, or (new) null resource allocation may be provided. In some cases, a network implementation can include a network entity that can send one DCI and leverage short message format depending on network preferences.

In some implementations, a UE may be configured such that in both IDLE and RRC_CONNECTED states, the UE reads both "detailed" short paging messages and scheduling information within a DCI message, along with reserved bits that contain "shortened" short paging message. An RRC_CONNECTED UE may still ignore scheduling information in a DCI message. In contrast, an IDLE UE may be configured to process both the short message(s) and the scheduling information.

In another implementation, a DCI format may contain a short message indicator bit and an additional indicator bit. The additional indicator bit, or a patter based on the two bits, may signal that the UE is required to decode P-RNTI PDSCH and drop C-RNTI PDSCH. In some implementations, bit usage can be consistent with a short message indicator (i.e., ignored if short message is used). In some implementations, a network can include a network entity that sends one DCI message and leverages short message format.

In some implementations, an indicator field may be provided in a paging DCI message that indicates the specific format of the paging DCI message. For example, in some cases, the indicator may indicate that the format of the paging DCI message includes only a paging message or it may indicate the paging DCI message includes scheduling information as well as a shorter paging message. In other cases, the indicator field may indicate that the paging DCI message includes scheduling information and a short paging message or the indicator field may indicate the DCI message includes only the scheduling information and one or more unused reserved bits.

In some implementations, an indicator field or bit(s) may also be a "null resource allocation" bit(s) that indicates the presence of either a larger short paging message or P-RNTI PDSCH scheduling information along with a shorter short paging message that is conveyed in the reserved bits. Null resource allocation means the resource allocation bits of the DCI determine whether DCI contains the larger short paging message or whether the DCI contains the P-RNTI PDSCH scheduling information and the shorter short paging message.

Thus, in the case where the indicator bit(s) is a null resource allocation bit(s), the following may be provided. If the resource allocation bits of the DCI signal valid resource allocation, then the DCI contains P-RNTI PDSCH scheduling information and a short paging message. Alternatively, if resource allocation bits of the DCI signal invalid resource allocation, then the DCI contains a larger short paging message. In one or more cases, the resource allocation could denote time or frequency allocation.

In other cases, the indicator bit can indicate other options. For example, in one or more implementations, the indicator bit may indicate that the paging DCI message includes P-RNTI PDSCH scheduling information and a shorter short paging message that is conveyed in reserved bits, or the indictor bit may indicate that the paging DCI message includes only the P-RNTI PDSCH scheduling information. In this case, there may be unused reserved bits in the paging DCI message. In such a case, the UE may treat the reserved bits of the DCI message as junk and/or simply recognize they are unused bits. In one or more cases, the idle UE can use the indicator field to identify and read both scheduling information and a shorter short paging message. A connected UE can use the indicator field to identify and read the shorter short paging message if it is configured and may use the indicator field to ignore the P-RNTI PDSCH scheduling information.

In some cases, an RRC_CONNECTED UE may be configured to decode P-RNTI-scrambled PDSCH and may ignore C-RNTI-scrambled PDSCH if it is simultaneously overlapping.

In some implementations, RRC_CONNECTED UEs are configured to prioritize P-RNTI-scrambled PDSCH whenever scheduling information is present in a DCI message, and drop any C-RNTI-scrambled PDSCH that is simultaneously overlapping in time.

Aspects described above with respect to methods 700 and 800 may help reduce hardware complexity for dealing with paging messages while a UE is in connected mode. This provides benefits of further system flexibility while not compromising UE implementation.

Figure 9:
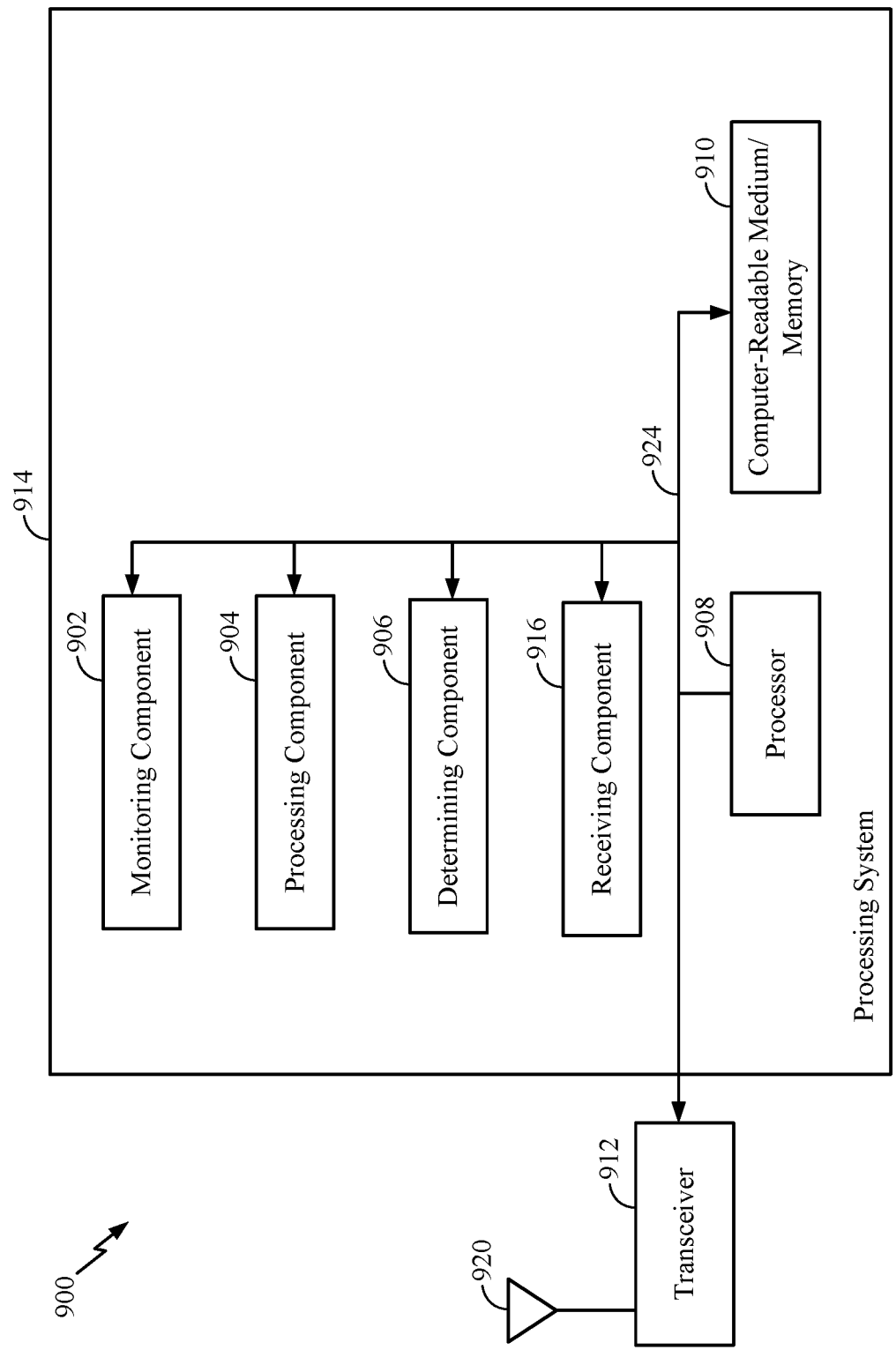
FIG. 9 illustrates a communications device that may include various components configured to perform operations for the techniques described herein in accordance with aspects of the present disclosure.

FIG. 9 illustrates a communications device 900 that includes various components (e.g., corresponding to means-plus-function components) configured to perform operations for the techniques disclosed herein, such as the operations 700 depicted and described in FIG. 7.

In the depicted embodiments, communications device 900 includes a processing system 914 coupled to a transceiver 912. The transceiver 912 is configured to transmit and receive signals for the communications device 900 via an antenna 920, such as the various signal described herein. The processing system 914 may be configured to perform processing functions for the communications device 900, including processing signals received and/or to be transmitted by the communications device 900.

The processing system 914 includes a processor 908 coupled to a computer-readable medium/memory 910 via a bus 924. In certain aspects, the computer-readable medium/memory 910 is configured to store instructions that when executed by processor 908, cause the processor 908 to perform the operations illustrated in FIG. 7, or other operations for performing the various techniques discussed herein.

In certain aspects, processing system 914 further includes monitoring component 902 for performing operations described herein. In some implementations, monitoring component 902 may be configured to perform the operations illustrated at 702 in FIG. 7.

Additionally, processing system 914 includes a processing component 904 for performing operations described herein. In some implementations, processing component 904 may be configured to performing the operations illustrated at 704 and 708 in FIG. 7.

Further, the processing system 914 includes a determining component 906 for performing operations described herein. In some implementations, processing component 906 may be configured to performing the operations illustrated at 706 and 710 in FIG. 7.

Further, the processing system 914 includes a receiving component 916 for performing operations described herein. In some implementations, processing component 906 may be configured to performing the operations illustrated at 702 in FIG. 7.

Monitoring component 902, processing component 904, determining component 906, and receiving component 916 may be coupled to the processor 908 via bus 924. In certain aspects, the monitoring component 902, processing component 904, determining component 906, and receiving component 916 may be hardware circuits. In certain aspects, the monitoring component 902, processing component 904, determining component 906, and receiving component 916 may be software components that are executed and run on processor 908.

Figure 10:
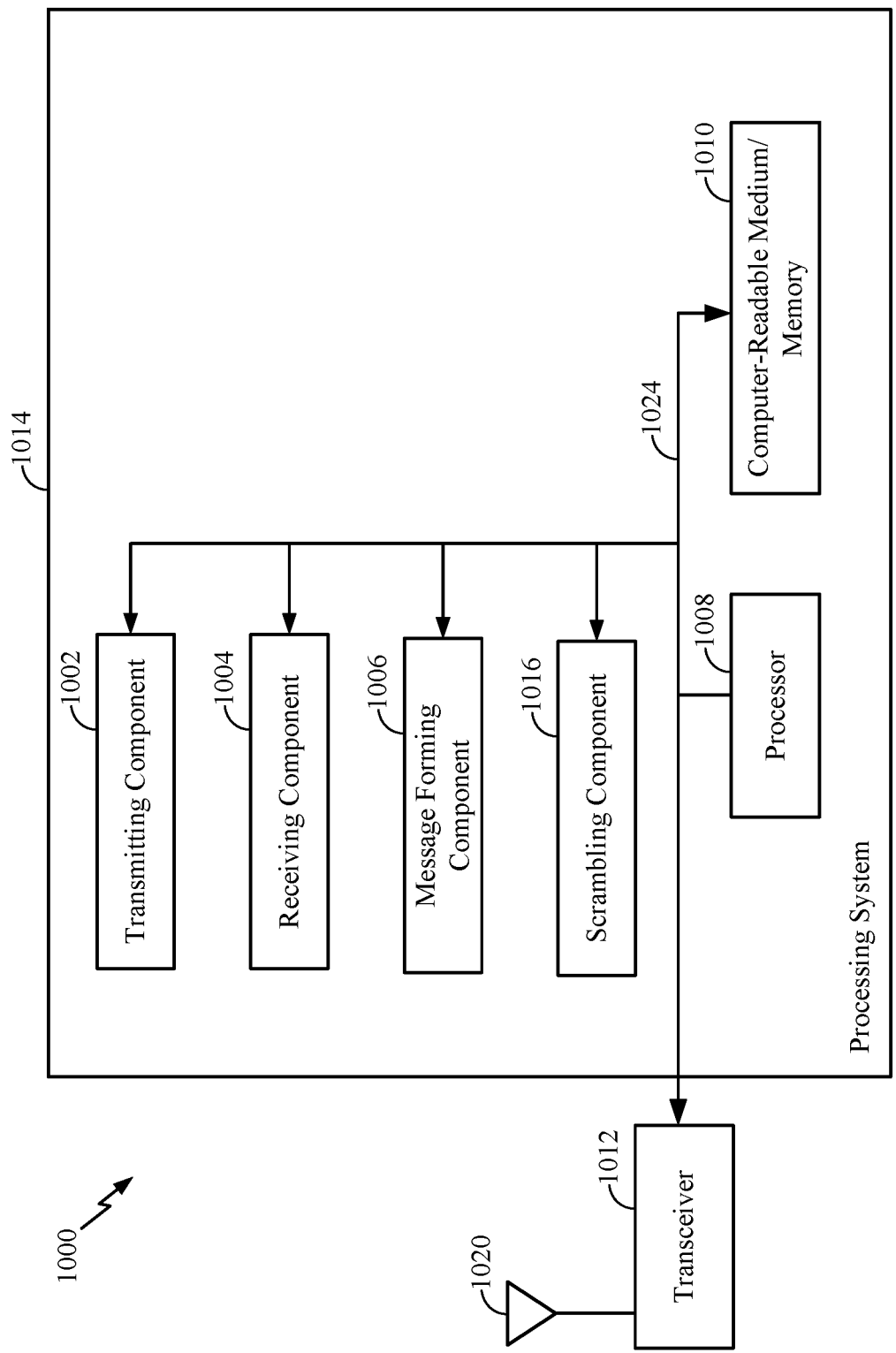
FIG. 10 illustrates a communications device that may include various components configured to perform operations for the techniques described herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8.

In this depicted embodiment, communications device 1000 includes a processing system 1014 coupled to a transceiver 1012. The transceiver 1012 is configured to transmit and receive signals for the communications device 1000 via an antenna 1020, such as the various signal described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations 800 illustrated in FIG. 8, or other operations for performing the various techniques discussed herein.

In certain aspects, processing system 1014 further includes transmitting component 1002 for performing operations described herein, such as the operations illustrated at 802 and 804 in FIG. 8. Additionally, processing system 1014 includes receiving component 1004 for performing operations described herein, such as the operations as described herein. The processing system 1014 further includes message forming component 1006 for performing operations as described herein. Finally, processing system 1014 further includes scrambling component 1016 for performing operations described herein.

Transmitting component 1002, receiving component 1004, message forming component 1006, and scrambling component 1006 may be coupled to the processor 1008 via bus 1024. In certain aspects, the transmitting component 1002, receiving component 1004, messaging forming component 1006, and scrambling component 1016 may be hardware circuits. In certain aspects, the transmitting component 1002, receiving component 1004, message forming component 1006, and scrambling component 1016 may be software components that are executed and run on processor 1008.

EXAMPLE EMBODIMENTS

The following are example embodiments. Even if single claim dependencies are indicated in the following examples, or in the claims below, all claim dependencies, including multiple claim dependencies, are included within the scope of the present disclosure.

Embodiment 1 a method for wireless communication by a user equipment (UE), comprising: monitoring for a paging downlink control channel comprising downlink control information, wherein the downlink control information comprises a first short message; processing the first short message; determining if the downlink control information further comprises scheduling information; processing the scheduling information if the downlink control information comprises scheduling information and the UE is not in a connected state; and ignoring the scheduling information if the downlink control information comprises scheduling information and the UE is in a connected state.

Embodiment 2

The method of Embodiment 1, wherein: the downlink control information comprises a first downlink control information message and a second downlink control information message, the first downlink control information message comprises the first short message, and the second downlink control information message comprises the scheduling information.

Embodiment 3

The method of Embodiment 2, where the second downlink control information message further comprises a second short message.

Embodiment 4

The method of Embodiment 3, wherein the connected state of the UE is a radio resource control (RRC)-connected state.

Embodiment 5

The method of any of Embodiments 3-4, wherein the first downlink control information message and the second downlink control information message are scrambled by a same paging—radio network temporary identifier (P-RNTI).

Embodiment 6

The method of any of Embodiments 3-4, wherein the first downlink control information message and the second downlink control information message are scrambled by different paging—radio network temporary identifiers (P-RNTIs).

Embodiment 7

The method of any of Embodiment 3-6, wherein the second downlink control information message schedules a physical downlink shared channel (PDSCH) scrambled with a P-RNTI.

Embodiment 8

The method of any of Embodiments 1-7, wherein the first short message comprises a short paging message that comprises one or more of: a system information update, a commercial mobile alert system (CMAS) update, or an earth quake and tsunami warning system (ETWS) update.

Embodiment 9

The method of any of Embodiments 3-8, wherein: the first downlink control information message comprises a first message format of a first bit length, and the second downlink control information message comprises a second format of a second bit length.

Embodiment 10

The method of Embodiment 9, wherein the second bit length comprises a subset of bits that does not get used to schedule paging PDSCH in in the second downlink control information message.

Embodiment 11

The method of any of Embodiments 9-10, wherein the first downlink control information message comprises more bits associated with at least one of an SI update, a CMAS update, or an ETWS update than the second downlink control information message.

Embodiment 12

The method of any of Embodiments 3-11, wherein: the connected state of the UE is an idle state, and the method further includes processing the second short message.

Embodiment 13

The method of any of Embodiments 3-12, wherein: at least one of the first downlink control information message or the second downlink control information message comprises a first indicator bit and a second indicator bit, and values of the first indicator bit and the second indicator bit are configured to signal the UE to decode a P-RNTI-scrambled PDSCH and to drop a cell—radio network temporary identifier (C-RNTI)-scrambled PDSCH.

Embodiment 14

The method of Embodiment 1, wherein the downlink control information comprises a first indicator field that indicates a format of the downlink control information.

Embodiment 15

The method of Embodiment 14, wherein: the first indicator field comprises resource allocation bits, the resource allocation bits indicate the first format comprises a first short message of a first length if the resource allocation bits signal an invalid resource allocation, and the resource allocation bits indicate a second format comprises the scheduling information and a second short message of a second length if the resource allocation bits signal a valid resource allocation.

Embodiment 16

The method of Embodiment 15, wherein the resource allocation bits indicate at least one of time or frequency allocation.

Embodiment 17

The method of Embodiment 1, wherein the downlink control information comprises a first indicator field that indicates at least one of a first or second format, the first format comprises the scheduling information and one or more unused reserved bits, and the second format comprises the scheduling information and a second short message.

Embodiment 18

The method of Embodiment 1, wherein the downlink control information comprises a first indicator field and a second indicator field.

Embodiment 19

A user equipment (UE), comprising: a memory comprising computer-executable instructions; a processor configured to execute the computer-executable instructions and cause the UE to: monitor for a paging downlink control channel comprising downlink control information, wherein the downlink control information comprises a first short message; process the first short message; and determine if the downlink control information further comprises scheduling information; process the scheduling information if the downlink control information comprises scheduling information and the UE is not in a connected state; and ignore the scheduling information if the downlink control information comprises scheduling information and the UE is in a connected state.

Embodiment 20

The UE of Embodiment 19, wherein: the downlink control information comprises a first downlink control information message and a second downlink control information message, the first downlink control information message comprises the first short message, and the second downlink control information message comprises the scheduling information and a second short message.

Embodiment 21

The UE of Embodiment 20, wherein the connected state of the UE is a radio resource control (RRC)-connected state.

Embodiment 22

The UE of any of Embodiments 20-21, wherein the first downlink control information message and the second downlink control information message are scrambled by a same paging—radio network temporary identifier (P-RNTI).

Embodiment 23

The UE of an of Embodiments 20-21, wherein the first downlink control information message and the second downlink control information message are scrambled by different paging—radio network temporary identifiers (P-RNTIs).

Embodiment 24

The UE of any of Embodiments 20-23, wherein the second downlink control information message schedules a physical downlink shared channel (PDSCH) scrambled with a P-RNTI.

Embodiment 25

The UE of any of Embodiment 19-24, wherein the first short message comprises a short paging message that comprises one or more of: a system information update, a commercial mobile alert system (CMAS) update, or an earth quake and tsunami warning system (ETWS) update.

Embodiment 26

The UE of any of Embodiments 20-25, wherein: the first downlink control information message comprises a first message format of a first bit length, and the second downlink control information message comprises a second format of a second bit length.

Embodiment 27

The UE of Embodiment 26, wherein the second bit length comprises a subset of bits that does not get used to schedule paging PDSCH in in the second downlink control information message.

Embodiment 28

The UE of any of Embodiments 26-27, wherein the first downlink control information message comprises more bits associated with at least one of an SI update, a CMAS update, or an ETWS update than the second downlink control information message.

Embodiment 29

The UE of any of Embodiments 26-2328 wherein: the connected state of the UE is an idle state, and the processor is further configured to cause the UE to: process the second short message.

Embodiment 30

The UE of any of Embodiments 20-29, wherein: at least one of the first downlink control information message or the second downlink control information message comprises a first indicator bit and a second indicator bit, and values of the first indicator bit and the second indicator bit are configured to signal the UE to decode a P-RNTI-scrambled PDSCH and to drop a cell—radio network temporary identifier (C-RNTI)-scrambled PDSCH.

Embodiment 31

A user equipment (UE), comprising: means for monitoring for a paging downlink control channel comprising downlink control information, wherein the downlink control information comprises a first short message; means for processing the first short message; means for determining if the downlink control information further comprises scheduling information; means processing the scheduling information if the downlink control information comprises scheduling information and the UE is not in a connected state; and means for ignoring the scheduling information if the downlink control information comprises scheduling information and the UE is in a connected state.

Embodiment 32

The UE of Embodiment 31, wherein: the downlink control information comprises a first downlink control information message and a second downlink control information message, the first downlink control information message comprises the first short message, and the second downlink control information message comprises the scheduling information and a second short message.

Embodiment 33

The UE of Embodiment 32, wherein: the first short message comprises a short paging message that comprises one or more of: a system information update, a commercial mobile alert system (CMAS) update, or an earth quake and tsunami warning system (ETWS) update, and the second downlink control information message schedules a physical downlink shared channel (PDSCH) scrambled with a P-RNTI.

Embodiment 34

A method for wireless communication by a network, comprising: transmitting a first downlink control information message on a paging downlink control channel, the first downlink control information message comprising a first short message; and transmitting a second downlink control information message on the paging downlink control channel, the second downlink control information message comprising scheduling information.

Embodiment 35

The method of Embodiment 34, wherein the second downlink control information message further comprises a second short message.

Embodiment 36

The method of Embodiment 35, wherein the first short message comprises a short paging message that comprises one or more of: a system information update, a commercial mobile alert system (CMAS) update, or an earth quake and tsunami warning system (ETWS) update.

Embodiment 37

The method of Embodiment 36, wherein the second downlink control information message schedules a physical downlink shared channel (PDSCH) scrambled with a paging—radio network temporary identifier (P-RNTI).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, operations 700 illustrated in FIG. 7 and operations 800 illustrated in FIG. 8 correspond to means illustrated in FIG. 9 and means illustrated in FIG. 10, respectively.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for monitoring, means for, processing, means for determining, means for prioritizing, and/or means for providing may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
monitoring for a paging downlink control channel comprising downlink control information, wherein the downlink control information comprises a first downlink control information message with a first short message and a second downlink control information message with scheduling information, and wherein at least one of the first downlink control information message or the second downlink control information message comprises a first indicator bit and a second indicator bit that are configured to signal the UE to decode a P-RNTI-scrambled Physical Downlink Shared Channel (PDSCH) instead of a cell radio network temporary identifier (C-RNTI)-scrambled PDSCH;
processing the first short message;
processing the scheduling information if the UE is not in a connected state; and
ignoring the scheduling information if the UE is in a connected state.

2. The method of claim 1, where the second downlink control information message further comprises a second short message.

3. The method of claim 2, wherein the connected state of the UE is a radio resource control (RRC)-connected state.

4. The method of claim 2, wherein the first downlink control information message and the second downlink control information message are scrambled by a same paging radio network temporary identifier (P-RNTI).

5. The method of claim 2, wherein the first downlink control information message and the second downlink control information message are scrambled by different paging—radio network temporary identifiers (P-RNTIs).

6. The method of claim 2, wherein the second downlink control information message schedules a physical downlink shared channel (PDSCH) scrambled with a P-RNTI.

7. The method of claim 2, wherein:
the first downlink control information message comprises a first message format of a first bit length, and
the second downlink control information message comprises a second format of a second bit length.

8. The method of claim 7, wherein the second bit length comprises a subset of bits that does not get used to schedule paging PDSCH in in the second downlink control information message.

9. The method of claim 7, wherein the first downlink control information message comprises more bits associated with at least one of an SI update, a CMAS update, or an ETWS update than the second downlink control information message.

10. The method of claim 7, wherein:
the connected state of the UE is an idle state, and
the method further includes processing the second short message.

11. The method of claim 1, wherein the first short message comprises a short paging message that comprises one or more of: a system information update, a commercial mobile alert system (CMAS) update, or an earth quake and tsunami warning system (ETWS) update.

12. A user equipment (UE), comprising:
a memory comprising computer-executable instructions;
a processor configured to execute the computer-executable instructions and cause the UE to:
monitor for a paging downlink control channel comprising downlink control information, wherein the downlink control information comprises a first downlink control information message with a first short message and a second downlink control information message with scheduling information, and wherein at least one of the first downlink control information message or the second downlink control information message comprises a first indicator bit and a second indicator bit that are configured to signal the UE to decode a P-RNTI-scrambled Physical Downlink Shared Channel (PDSCH) instead of a cell—radio network temporary identifier (C-RNTI)-scrambled PDSCH;
process the first short message; and
process the scheduling information if the UE is not in a connected state; and
ignore the scheduling information if the UE is in a connected state.

13. The UE of claim 12, wherein:
the second downlink control information message comprises the scheduling information and a second short message.

14. The UE of claim 13, wherein the connected state of the UE is a radio resource control (RRC)-connected state.

15. The UE of claim 13, wherein the first downlink control information message and the second downlink control information message are scrambled by a same paging—radio network temporary identifier (P-RNTI).

16. The UE of claim 13, wherein the first downlink control information message and the second downlink control information message are scrambled by different paging—radio network temporary identifiers (P-RNTIs).

17. The UE of claim 13, wherein the second downlink control information message schedules a physical downlink shared channel (PDSCH) scrambled with a P-RNTI.

18. The UE of claim 13, wherein:
the first downlink control information message comprises a first message format of a first bit length, and
the second downlink control information message comprises a second format of a second bit length.

19. The UE of claim 18, wherein the second bit length comprises a subset of bits that does not get used to schedule paging PDSCH in the second downlink control information message.

20. The UE of claim 18, wherein the first downlink control information message comprises more bits associated with at least one of an SI update, a CMAS update, or an ETWS update than the second downlink control information message.

21. The UE of claim 18, wherein:
the connected state of the UE is an idle state, and
the processor is further configured to cause the UE to:
process the second short message.

22. The UE of claim 12, wherein the first short message comprises a short paging message that comprises one or more of: a system information update, a commercial mobile alert system (CMAS) update, or an earth quake and tsunami warning system (ETWS) update.

23. A user equipment (UE), comprising:
means for monitoring for a paging downlink control channel comprising downlink control information, wherein the downlink control information comprises a first downlink control information message with a first short message and a second downlink control information message with scheduling information, and wherein at least one of the first downlink control information message or the second downlink control information message comprises a first indicator bit and a second indicator bit that are configured to signal the UE to decode a P-RNTI-scrambled Physical Downlink Shared Channel (PDSCH) instead of a cell—radio network temporary identifier (C-RNTI)-scrambled PDSCH;
means for processing the first short message;
means for processing the scheduling information if the the UE is not in a connected state; and
means for ignoring the scheduling information if the UE is in a connected state.

24. The UE of claim 23, wherein:
the second downlink control information message comprises the scheduling information and a second short message.

25. The UE of claim 24, wherein:
the first short message comprises a short paging message that comprises one or more of: a system information update, a commercial mobile alert system (CMAS) update, or an earth quake and tsunami warning system (ETWS) update, and
the second downlink control information message schedules a physical downlink shared channel (PDSCH) scrambled with a P-RNTI.

26. A method for wireless communication by a network, comprising:
transmitting a first downlink control information message on a paging downlink control channel, the first downlink control information message comprising a first short message; and
transmitting a second downlink control information message on the paging downlink control channel, the second downlink control information message comprising scheduling information,
wherein at least one of the first downlink control information message or the second downlink control information message comprises a first indicator bit and a second indicator bit that are configured to signal a User Equipment (UE) to decode a P-RNTI-scrambled Physical Downlink Shared Channel (PDSCH) instead of a cell—radio network temporary identifier (C-RNTI)-scrambled PDSCH.

27. The method of claim 26, wherein the second downlink control information message further comprises a second short message.

28. The method of claim 27, wherein the first short message comprises a short paging message that comprises one or more of: a system information update, a commercial mobile alert system (CMAS) update, or an earth quake and tsunami warning system (ETWS) update.

29. The method of claim 28, wherein the second downlink control information message schedules a physical downlink shared channel (PDSCH) scrambled with a paging—radio network temporary identifier (P-RNTI).

* * * * *